United States Patent
Qiu et al.

(10) Patent No.: US 9,277,526 B2
(45) Date of Patent: Mar. 1, 2016

(54) LOCATION TRUST SCORE

(71) Applicants: Weigen Qiu, Calgary (CA); Mark Goddard, Rancho Santa Margarita, CA (US)

(72) Inventors: Weigen Qiu, Calgary (CA); Mark Goddard, Rancho Santa Margarita, CA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/319,799

(22) Filed: Jun. 30, 2014

(65) Prior Publication Data

US 2015/0327208 A1    Nov. 12, 2015

Related U.S. Application Data (60) Provisional application No. 61/989,153, filed on May 6, 2014.

(51) Int. Cl.
*H04W 4/02* (2009.01)
*H04W 64/00* (2009.01)

(52) U.S. Cl.
CPC ..................... *H04W 64/00* (2013.01)

(58) Field of Classification Search
CPC ... H04W 4/028; H04W 4/02; H04W 72/1231; H04L 65/1073; H04L 17/0066; G01P 13/00
USPC ............... 455/456.1, 412.2; 705/26.41, 14.4; 370/329

See application file for complete search history.

(56) References Cited

U.S. PATENT DOCUMENTS

| 8,327,131 | B1 | 12/2012 | Hardjono et al. |
| 8,681,741 | B1 | 3/2014 | Ngo et al. |
| 2006/0148450 | A1 | 7/2006 | Lortz |
| 2012/0258733 | A1* | 10/2012 | Fischer et al. ............. 455/456.1 |
| 2013/0012226 | A1 | 1/2013 | Leclercq et al. |
| 2014/0120950 | A1* | 5/2014 | Fulton et al. ............... 455/456.1 |

FOREIGN PATENT DOCUMENTS

WO   WO 2010/065253 A2   6/2010

* cited by examiner

*Primary Examiner* — Phuoc H Doan
(74) *Attorney, Agent, or Firm* — Tarolli, Sundheim, Covell & Tummino LLP (57) ABSTRACT

A gateway can be configured to receive measurement data that can characterizes measurements taken at a mobile device. The measurement data can include location information for the mobile device. The gateway can also be configured to calculate a location trust score for the mobile device. The location trust score can characterize the likelihood that the location information is at least one of accurate and trustworthy. The gateway can be further configured to generate trusted location information that characterizes a location of the mobile device based on the location trust score.

20 Claims, 6 Drawing Sheets

LOCATION TRUST SCORE

CROSS-REFERENCE TO RELATED APPLICATION

This application claims the benefit of priority to U.S. Provisional Application No. 61/989,153, filed on May 6, 2014, and entitled TRUSTED MOBILE LOCATION ARCHITECTURE, the entirety of which is herein incorporated by reference.

TECHNICAL FIELD

This disclosure relates to a location trust score for a mobile device.

BACKGROUND

Location tracking can refer to the attaining of the current position of a device (e.g., mobile phone) stationary or moving. Localization may occur either via multilateration of radio signals between (several) radio towers of the network and the device, or simply via a global positioning system (GPS). To locate a wireless device (e.g., a mobile phone) using multilateration of radio signals, the wireless device emits a roaming signal to contact the next nearby antenna tower, but the process does not require an active call. In some examples, the location of the wireless device can be based on the signal strength to nearby antenna masts.

The Mobile Location Protocol (MLP) is an application-level protocol for receiving the position of Mobile Stations (e.g., mobile phones, wireless devices, etc.) independent of underlying network technology. The MLP serves as the interface between a Location Server and a location-based application. MLP Services are based on location services defined by the third generation partner project (3GPP).

SUMMARY

One example relates to a gateway including one or more computers having machine readable instructions. The gateway can be configured to receive measurement data that characterizes measurements taken at a mobile device. The measurement data can include location information for the mobile device. The gateway can also be configured to calculate a location trust score for the mobile device. The location trust score can characterize the likelihood that the location information is at least one of accurate and trustworthy. The gateway can also be configured to generate trusted location information that characterizes a location of the mobile device based on the location trust score.

Another example relates to a system including a memory configured to store machine readable instructions and a processing unit configured to access the memory and execute the machine readable instructions. The machine readable instructions can include a message handler configured to receive measurement data that includes measurements taken by a mobile device. The measurement data can include location information for the mobile device. The machine readable instructions can also include a location determiner configured to select between employing carrier location information provideable from a network node of a carrier network for the mobile device and employing the location information included in the measurements to generate trusted location information for the mobile device based on a location trust score for the mobile device.

Yet another example relates to a method that can include receiving information related to a mobile device that includes measurements taken at the mobile device. The measurements can include location information for the mobile device. The method can also include determining a location trust score for the mobile device. The location trust score characterizes the likelihood that the location information is at least one of accurate and trustworthy. The method can further include selecting between employing carrier location information provideable from a network node of a carrier network for the mobile device and employing the location information included in the measurements to generate trusted location information for the mobile device based on a location trust score of the mobile device.

DETAILED DESCRIPTION

This disclosure relates to determining whether location information determined at a mobile device is accurate and/or trustworthy. In one example, a Trusted Location gateway can be configured to receive measurement data that can include measurements taken at a mobile device, as well as mobile device information collected by mobile device management (MDM) applications/servers or from the mobile device. The measurements can include location information of the mobile device. The gateway can calculate a location trust score for the mobile device. The location trust score can characterize the likelihood that the location information is accurate and/or trustworthy. To determine the location trust score, the gateway can execute one or more tests that analyze the mobile device information and/or the measurements.

Based on the location trust score, the gateway can select between querying a carrier network of the mobile device for carrier location information and employing the location information in the measurements to generate trusted location information for the mobile device. By employing the systems and methods described herein, a recipient of the trusted location information (e.g., an enterprise server) can reasonably rely on the accuracy of the trusted location information.

Figure 1:
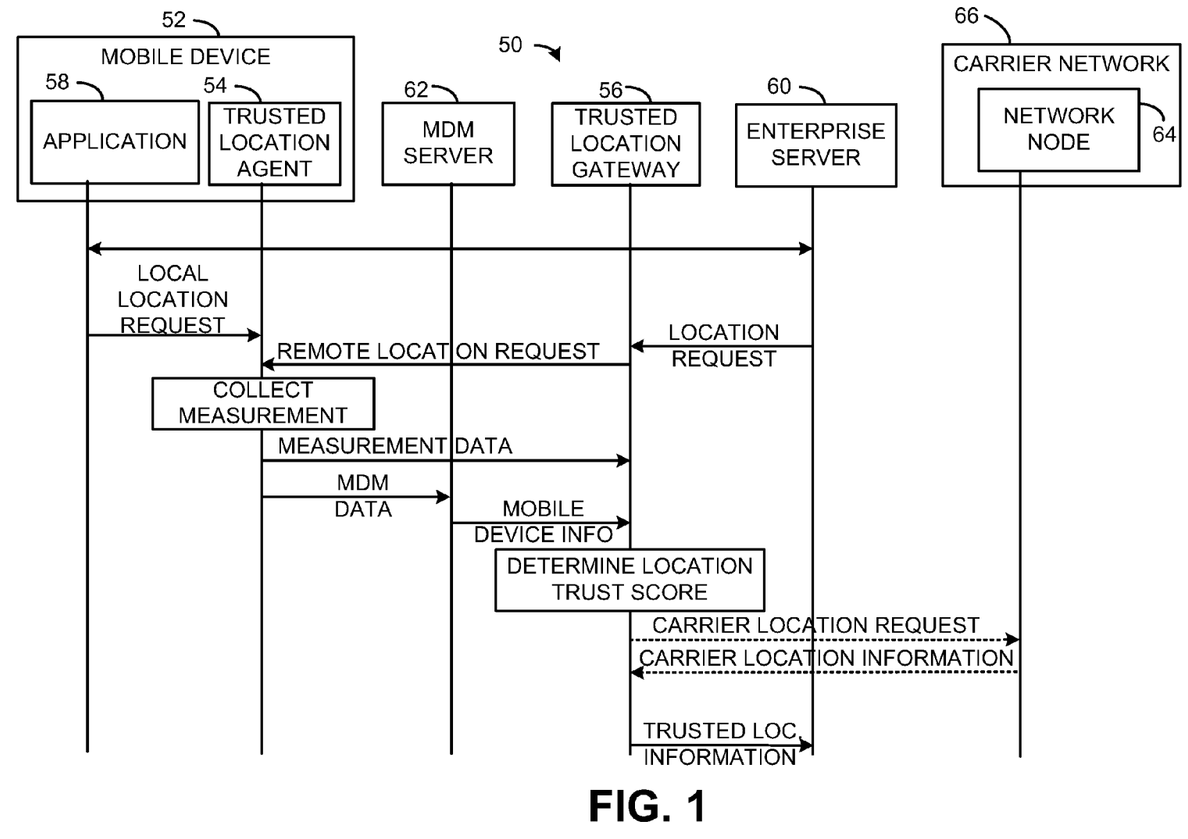
FIG. 1 illustrates an example of a system to determine whether location information provided from a mobile device is accurate and/or trustworthy.

FIG. 1 illustrates an example of a system 50 for determining whether a location provided from a mobile device 52 is accurate and/or trustworthy. The mobile device 52 could be implemented, for example, as a wireless computing device, such as a laptop computer, a tablet computer, a wireless phone (e.g., a smart phone) or a combination thereof.

Communications between components of the system 50 can be conducted securely (e.g., via encryption). Accordingly, users of the various devices in the system 50 can be assured that the communications are not compromised by an unauthorized user (e.g., a hacker).

Accuracy of a location for the mobile device 52 can indicate a relative closeness to the mobile device's actual (true) physical location. The mobile device 52 has many different mechanisms to determine the location of the mobile device 52, such as a global positioning system (GPS), a signal triangulation mechanism, etc. The trustworthiness of a location indicates a relative degree of likelihood that the location of the mobile device 52 has been spoofed (e.g., fraudulently reported). A location may not be accurate (while remaining trustworthy), for example, in situations where the mobile device 52 is unable to accurately measure the location due, for example to a poor quality connection and/or a poor view of the open sky. Additionally, a location may not be trustworthy (while remaining accurate) in examples where the mobile device 52 has been hacked in a manner that permits location spoofing, but the user has elected to provide a non-spoofed location of the mobile device 52.

The mobile device 52 can execute a Trusted Location Agent 54 configured to communicate with a Trusted Location gateway 56 via a network, such as the Internet and/or a private network. The Trusted Location gateway 56 can be implemented, for example, as a server or other computing device. It is noted that in some examples, some or all of the functionality of the Trusted Location gateway 56 can be implemented on the mobile device 52, such as being integrated with the Trusted Location Agent 54 and/or as a separate application executing on the mobile device. The mobile device 52 can include application software (an application 58) executing thereon that can cooperate with the Location Agent 54 and another service, such as a service executing on an enterprise server 60. The application 58 could be, for example, a dedicated app, such as dedicated client or applet executing on a web browser that communicates with the enterprise server 60 via a public network (e.g., the Internet), a private network (e.g., a cellular data network) or a combination thereof (e.g., a virtual private network).

The enterprise server 60 can be configured to request an accurate location of the mobile device 52. The application 58 executing at the mobile device 52 could be a client for the enterprise that communicates with the enterprise server 60. For instance, if the enterprise is a gambling company (e.g., an online gambling company), the application 58 could be implemented, for example, as a gaming interface (e.g., online poker, blackjack, craps, slot machines, etc.) for a user. In other situations, if the enterprise is a financial institution (e.g., a credit card business), the application 58 could be an applet or webpage of a web browser that communicates with the enterprise server 60.

As noted, the enterprise associated with the enterprise server 60 may need a high degree of reliability for a determined physical location of the mobile device 52. For instance, online gambling is legal only in a few jurisdictions (e.g., Nevada). In such a situation, the enterprise may desire to leverage the services of the Trusted Location gateway 56 to ensure that the physical location of the mobile device 52 is within the boundaries of one of those jurisdictions. In another situations, if the enterprise is implemented as a financial institution (e.g., a lending bank), the enterprise may need to verify that the mobile device 52 is in a particular jurisdiction (e.g., country) to increase the likelihood that a user of the mobile device 52 is operating in a legal (e.g., non-fraudulent) manner. Thus, the Trusted Location gateway 56 can be configured to provide trusted location information to the enterprise server 60 by implementing the method and functions described herein.

In some examples, a location request can be initiated in response to a user employing the application 58 to log-on to a service of the enterprise server 60. In some situations, the enterprise server 60 can provide a location request (labeled in FIG. 1 as "LOCATION REQUEST") for a physical location of the mobile device 52 to the Trusted Location gateway 56. In such a situation, the Trusted Location gateway 56 can issue a remote location request (labeled in FIG. 1 as "REMOTE LOCATION REQUEST") to the Trusted Location agent 54 of the mobile device 52. The remote location request could be, for example, a short message service (SMS) message, a push notification and/or a cloud message (e.g., an APPLE® push notification and/or a GOOGLE® cloud message), etc. Additionally or alternatively, the application 58 of the mobile device 52 (e.g., via a Java script) can send a local location request (labeled in FIG. 1 as "LOCAL LOCATION REQUEST") to the Trusted Location agent 54.

In either example, in response to the remote location request or the local location request, the Trusted Location agent 54 can be configured to collect measurements from the mobile device 52. The measurements can include, for example, raw data collected from another source, such as satellite signal, a cellular communications tower, a Wi-Fi® router, etc. The measurements can include, for example, GPS information, such as satellite signal data, an identification of in-view GPS satellites, etc. Additionally, the measurements can include parameters (e.g., settings) of an operating system (OS) of the mobile device 52 and a list of applications stored/installed on the mobile device 52. The measurements can also include information such as a cell identifier (cell-ID) that identifies cellular towers communicating with the mobile device 52. The measurements can further include information that identifies Wi-Fi® sources communicating with the mobile device 52. The measurements can also include location information that characterizes a reported position (e.g., latitude and longitudinal coordinates, a civic address etc.), of the mobile device 52. In some examples, the location information can also characterize the method in which the location is determined (e.g., via GPS data, Wi-Fi® data, cellular data, etc.).

Measurement data (labeled in FIG. 1 as "MEASUREMENT DATA") including the measurements can be (securely) transmitted to the Trusted Location gateway through the employment of ULP (UserPlane Location Protocol) or other appropriate protocols. In some examples, the measurement data can be encrypted such that communications between the mobile device 52 and the Trusted Location gateway 56 are secure. Additionally, other data and/or the measurements can be transmitted to an MDM server, which data can be referred to as MDM data. In some examples, the MDM server 62 can have an associated agent executing on the mobile device 52 to generate the MDM data. The MDM server 62 can determine a tampering status of the mobile device 52. To determine the tampering status, the MDM server 62 can evaluate the MDM data to determine if the mobile device 52 has been "hacked" to achieve privilege escalation. For example, the MDM server 62 can analyze an application signature in the MDM data that can be separately collected from the mobile device 52 to determine if the mobile device 52 has been "jailbroken" and/or "rooted" such that root access to the mobile device 52 has been granted. The MDM server 62 can provide the Trusted Location gateway 56 with mobile device information (labeled in FIG. 1 as "MOBILE DEVICE INFO") that characterizes the tampering status of the mobile device 52. In some examples, the functions of the MDM server 62 can be integrated with the trusted location agent 54 executing on the mobile device 52. In such a situation the measurement data and the mobile device information can be combined into a single message or transmitted separately.

The Trusted Location gateway 56 can analyze the measurement data from the mobile device to determine a location trust score for the mobile device 52. Additionally, as described herein, in some examples, the Trusted Location gateway 56 can also employ the mobile device information to determine the location trust score. The location trust score can characterize a likelihood that the location reported by the mobile device 52 (e.g., latitude and longitude coordinates in the measurements) is accurate and/or trustworthy. The location trust score can be based, for example, on an execution of one or more tests. The one or more tests can include, for example, an analysis of visible GPS satellites reported in the measurements. The one or more tests can also include determining whether a significant distance change reported since a previous time that the location of the mobile device 52 had been requested. The one or more tests can further include an analysis comparing of the cell-ID, the identifiers of the Wi-Fi® and the GPS data in the measurements. The one or more tests can still further include examining a list of applications executing on the mobile device 52 to determine if any of the applications are "blacklisted". Still further, the one or more tests can include an analysis of historical location trust scores for the mobile device 52 as well as parameters of the mobile device 52 that are included in the measurements.

In some examples, the Trusted Location gateway 56 can be configured such that if the location trust score is below a predetermined threshold, the Trusted Location gateway 56 can deem the location reported by the mobile device 52 to be untrustworthy. In such a situation, the Trusted Location gateway 56 can be configured to issue a carrier location request (labeled in FIG. 1 as "CARRIER LOCATION REQUEST") to a network node 64 (e.g., a server or switch) on a carrier network 66 (e.g., a home location register, a mobile switch, etc.) that provides service to the mobile device 52 for carrier location information of the mobile device 52. The carrier network could be, for example, a 3G network, a 4G network, a Long Term Evolution (LTE) network or a combination thereof. The carrier network 66 can return the requested carrier location information (labeled in FIG. 1 as "CARRIER LOCATION INFORMATION") to the Trusted Location gateway 56. The carrier location information is typically obtained without significant control being passed to the mobile device 52. Accordingly, the carrier location information can be deemed to be accurate and trustworthy. Thus, in this situation, the Trusted Location gateway 56 can provide trusted location information (labeled in FIG. 1 as "TRUSTED LOC INFORMATION") to the enterprise server 60 that characterizes the carrier location information reported by the carrier network 66.

Additionally, the Trusted Location gateway 56 can be configured such that if the trust score determined by the Trusted Location gateway 56 is at or above a predetermined threshold level, the Trusted Location gateway 56 can deem the location determined by the mobile device 52 to be accurate and/or trustworthy. In this situation, the Trusted Location gateway 56 can provide the trusted location information to the enterprise server 60 that characterizes the location determined by the mobile device 52 and/or the trust score calculated for the mobile device 52. The trusted location information can be transmitted securely (e.g., via encryption) to the enterprise 60.

In other examples, a continuum rather than the threshold level can be employed to evaluate the location trust score. For example, in some situations, the location trust score may be below the threshold level, but due to the non-criticality and/or cost of an inaccurate and/or spoofed location being inadvertently employed, some systems can be configured to employ the location determined by the mobile device 52 as the location included in the trusted location. It is to be understood that there are many other different ways that the location trust score can be calculated and/or relied upon to determine the accuracy and/or trustworthiness of the mobile device 52.

In some examples, the Trusted Location gateway 56 and/or the Trusted Location agent 54 can be configured such that an initial (or partial) trusted location information including an initial (or partial) location and an initial (or partial) trusted score be calculated based on partially collected data for the mobile device 52 provided to the enterprise server 60. In such a situation, an updated (or final) trusted location information including an updated (or final) location and updated (or final) trusted score can be subsequently calculated and provided to the enterprise server 60 based on a full set of data collected on the mobile device 52 and/or a full set of tests executed by the trusted location agent 56. In such a situation, the enterprise server 60 could receive and employ the initial location information for certain applications without having to wait for the entire testing process at the Trusted Location gateway and/or the entire measurement process at the mobile device 52 to complete.

Accordingly, by employing the system 50, the enterprise server 60 can reasonably rely on the accuracy and/or trustworthiness of the trusted location information for the mobile device 52 that is provided by the Trusted Location gateway 56. Moreover, the Trusted Location gateway 56 can be configured to reduce queries to the network node 64 of the carrier network 66 for the carrier location information, which may incur a per-request charge, since the network node 64 of the carrier network 66 would only need to be queried for the carrier location information of mobile devices 52 with a location trust score below the predetermined threshold.

Figure 2:
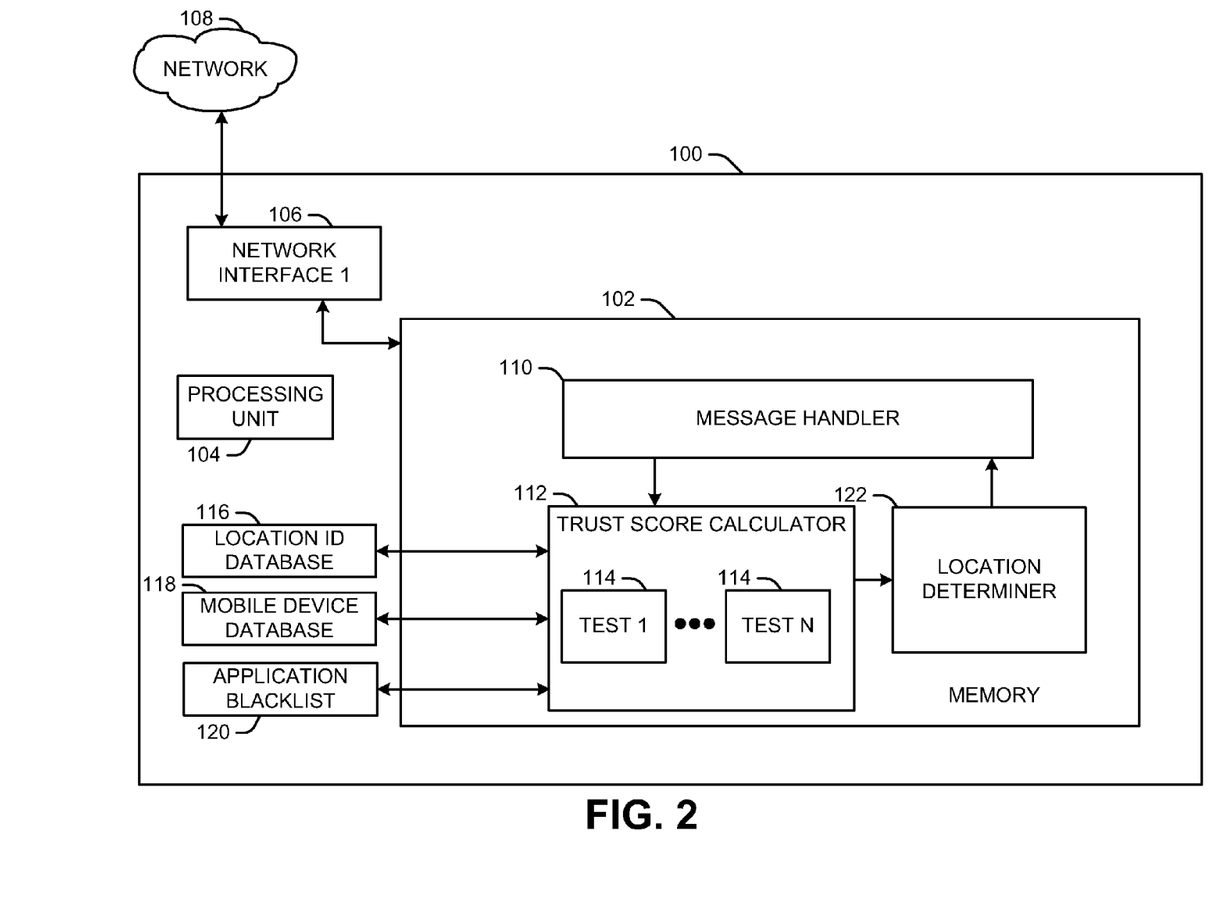
FIG. 2 illustrates an example of a gateway that can determine whether location information provided from a mobile device is accurate and/or trustworthy.

FIG. 2 illustrates an example of a Trusted Location gateway 100 that could be employed, for example, as the Trusted Location gateway 56 illustrated in FIG. 1. The Trusted Location gateway 100 can include a memory 102 that can store machine readable instructions. The memory 102 could be implemented, for example, as non-transitory computer readable media, such as volatile memory (e.g., random access memory), nonvolatile memory (e.g., a hard disk drive, a solid state drive, flash memory, etc.) or a combination thereof. The Trusted Location gateway 100 can also include a processing unit 104 to access the memory 102 and execute the machine-readable instructions. The processing unit 104 can include, for example, one or more processor cores. The Trusted Location gateway 100 can include a network interface 106 configured to communicate with a network 108. The network interface 106 could be implemented, for example, as a network interface card. The network 108 could be implemented for example, as a public network (e.g., the Internet), a private network (e.g., a carrier network) or combination thereof (e.g., a virtual private network).

The Trusted Location gateway 100 could be implemented, for example in a computing cloud. In such a situation, features of the Trusted Location gateway 100, such as the processing unit 104, the network interface 106, and the memory 102 could be representative of a single instance of hardware or multiple instances of hardware with applications executing across the multiple of instances (i.e., distributed) of hardware (e.g., computers, routers, memory, processors, or a combination thereof). Alternatively, the gateway 100 could be implemented on a single dedicated server.

The Trusted Location gateway 100 can include a message handler 110 that can send and receive network messages via the network interface 106. In some examples, the message handler 110 can receive incoming network messages implemented as a location request for a mobile device. The location request could be provided, for example, from an enterprise server (e.g., the enterprise server 60 of FIG. 1). The location request can include, for example, information that uniquely identifies the mobile device (e.g., a telephone number, a network address, an International Mobile Subscriber Identity (IMSI), etc.). The location request can also include, for example, a boundary defining a specific geographic region. In response to the location request, the message handler 110 can push a remote location request to a Trusted Location agent executing on the mobile device via the network interface 106. The remote location request could be implemented, for example, as an SMS message, as a push notification and/or a cloud message (e.g., an APPLE® push notification and/or a GOOGLE® cloud message).

In response, the message handler 110 can receive measurement data from the mobile device via the network 108. Additionally, in some examples, the message handler 110 can receive mobile device information from an MDM server via the network 108 or from the mobile device. Alternatively, as explained with respect to FIG. 1, the Trusted Location gateway 100 may receive the measurements and/or the mobile device information asynchronously (e.g., in the absence of providing the remote location request). The message handler 110 can provide the measurement data and the mobile device information to a trust score calculator 112 that is stored in the memory 102.

The mobile device information can include, for example, a tampering status of the mobile device. The measurement data can include measurements taken at the mobile device. The measurements can include, for example, location information, as determined by the mobile device that characterizes a physical location of the mobile device. The measurements can also include a list of GPS satellites that are within view of the mobile device as well as GPS data that characterizes signals received from the list of GPS satellites. The measurements can further include a cell-ID of a cellular communications tower communicating with the mobile device, as well as a service set identifier (SSID) of a Wi-Fi® router communicating with the mobile device. The measurements can also include a list of settings on the mobile device and a list of applications installed on the mobile device. In some examples, the measurements may still further include the aforementioned boundary of the specific geographic region. It is noted that in some examples, different mobile devices can provide different sets of information, such that the measurement data and/or the mobile device information can be different for different mobile devices. The set of information included in the measurements may be based, for example, on the OS of the mobile device.

The trust score calculator 112 can be configured to analyze the measurement data to derive a location trust score that characterizes the likelihood that the location information derived by the mobile device is accurate and/or trustworthy. Additionally, in some examples, the trust score calculator 112 can also employ the mobile device information to calculate the location trust score. To determine the location trust score, the trust score calculator 112 can execute N number of tests 114, where N is an integer greater than or equal to one. It is noted that the number of the N number of tests 114 executed for a given mobile device is based on the information included in the measurements. As previously noted, different mobile devices may include different sets of information in the measurements. Moreover, although the N number of tests 114 are described as executing in a sequential order, the N number of tests 114 can be executed in any order. Moreover, two or more of the N number of tests 114 can be executed concurrently. The location trust score can be a weighted sum of the results of the N number of tests 114.

In the present examples given herein, positive results for a test of the N number of tests 114 indicates an increased likelihood that a location characterized in the measurements is accurate and/or trustworthy. Additionally, negative results for a test of the N number of tests 114 can indicate that the location characterized in the measurements may not be accurate and/or trustworthy. In other examples, different results could be employed. The list of tests described herein is not intended to be exhaustive. In other examples, other tests could be employed to determine the accuracy and/or trustworthiness of the location characterized in the measurements taken by the mobile device.

A first test of the N number of tests 114 can be boundary test that can make a determination of whether the location information derived by the mobile device characterizes a location within the boundary of the specific geographic region identified in the location request and/or the measurement data. If the boundary test determines that the location information indicates that the mobile device is outside the boundary of the specific geographic region, in some examples, the results of the boundary test can be positive. Moreover, if the boundary test determines that the location information indicates that the mobile device is inside the boundary of the specific geographic region, the results of the boundary test can be negative.

Additionally or alternatively, in some examples, the boundary test may set the trust score to a relatively high value, and cease further execution of the N number of tests 114. This may be implemented, for example, in situations where an enterprise associated with the enterprise server is an online gambling business or a financial institution that is inquiring whether the mobile device is within the boundary of the specific geographic region. In some examples, the boundary test can be configured such that if the mobile device reports a physical location of the mobile device as being outside that specific geographic region, it is presumed that that a user of the mobile device will be denied services (e.g., online gambling and/or an extension of credit) by the enterprise such that no further testing of the accuracy and/or trustworthiness of the location information of the mobile device is needed. If the boundary test indicates that the location characterized in the location information derived by the mobile device is within the boundary, the trust score calculator 112 can cause additional tests 114 of the N number of tests 114 to be executed.

A second test of the N number of tests 114 can be a GPS data test. The GPS data test can analyze the measurements to determine if GPS information (e.g., signals and/or data) included in the measurements would reflect actual GPS signals received from satellites at the location characterized in the location information. The GPS data test can analyze GPS data included in the measurements to see if GPS data is static (e.g., non-changing). The GPS data test can also include an analysis of the GPS satellites in view of the mobile device (as identified in the measurements) as compared to the location information. The GPS data test can also access a location identification (ID) database 116 (or lookup table) to retrieve a list of satellites that would ordinarily be in view if the mobile device were in fact at the physical location characterized in the location information of the measurements. Such a retrieved list of satellites can be compared with the list of visible satellites recorded in the National Marine Electronics Association (NMEA) records that can be included the measurement data collected at the mobile device.

The GPS data test can be configured such that if the mobile device reports viewing a satellite that would be impossible to view from the location characterized in the location information at or near the time the measurement data is received, the GPS data test can generate negative results. For instance, if the mobile device reports a location in the location information within the boundary of Las Vegas, Nev., USA, but reports that a particular satellite is viewable, and the particular satellite would only be viewable in another geographic region (e.g., New York) at or near a time that the measurement data is received, the GPS data test can determine that the location reported in the location information may not be trustworthy.

Similarly, if the GPS data test indicates that data received from GPS satellites is static (e.g., non-changing) or replayed, the GPS data test can generate negative results for the GPS data test. For example, latitude and longitude coordinates reported on the mobile device should be constantly changing in the last few digits due to random measurement error. If the last few digits of the reported latitude and longitude coordinates do not change over time, the GPS data can be determined to be static and/or a replay or previous data.

Conversely, the GPS data test can be configured such that if all satellites reported in view of the mobile device at the location characterized in the location information would in fact be in view of the mobile device at or near the time the measurement data is received, and the GPS data received from the satellites is dynamic (e.g., changing over time) and not-replayed, the GPS data test can generate positive results.

A third test of the N number of tests 114 can be a location error test. The error location test can include, for example, an analysis of two sets of data included in the measurement data. A given set of data employed in the location error test can be a location derived at the mobile device (e.g., latitude and longitude coordinates) that has been calculated based on SSIDs of Wi-Fi® routers and cell-IDs of communications towers. In such a situation, the mobile device can query a location database, such as an external database to facilitate derivation of the location of the mobile device.

Additionally, another set of data can include SSIDs of WiFi® routers and/or cell-IDs cellular communication towers that have been scanned by the mobile device. The location error test can be configured such that if the location identified in the location information is a GPS derived location, a Wi-Fi® derived location and/or a cell-ID derived location, the location error test can compare the location characterized in the location information to a location corresponding to cell-IDs and/or SSIDs of Wi-Fi® routers. The location error test can analyze the measurement data to identify Wi-Fi® routers communicating with the mobile device based on SSIDs included in the measurements. Moreover, the location error test can query the location ID database 116 (or other lookup table) to determine an area serviced by the identified Wi-Fi® routers. The location ID database 116 can operate independently of the location database queried by the mobile device to derive the location information provided. Similarly, the location error test can analyze the measurement data to identify a cellular communications tower communicating with the mobile device based on cell-IDs included in the measurements. Moreover, the location error test can query the location ID database 116 (or other lookup table) to determine an area serviced by the identified cellular communications tower. Additionally, based on the queries to the location ID database 116, the trust score calculator 112 can derive location information (e.g., latitude and longitude coordinates) for the mobile device. In such a situation, the location derived by the trust score calculator 112 can be compared to the location derived by the mobile device to determine if the derived locations are within a determined margin of error.

Additionally or alternatively, the location error test can determine if the location characterized by the location information is (within a margin of error) within an area serviced by the identified Wi-Fi® routers. Additionally or alternatively, the location error test can also determine if the area serviced by the identified Cell-IDs is within an area serviced by the identified cellular communications towers.

Figure 3:
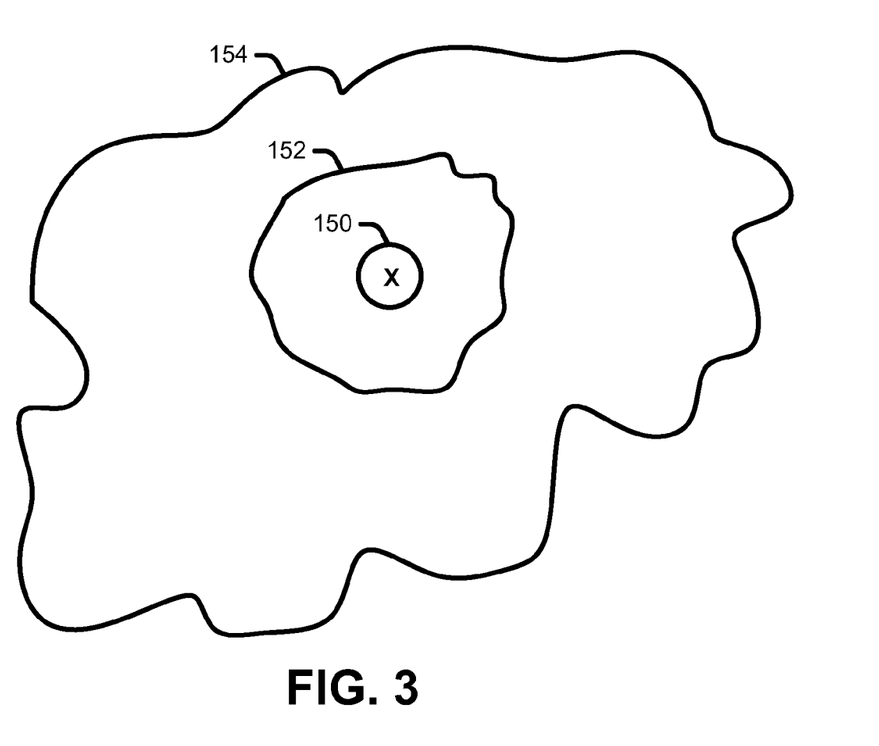
FIG. 3 illustrates a conceptualized example of an analysis of a location error test.

FIG. 3 depicts a conceptualized illustration of an example of analysis of the location error test. In FIG. 3, a given location marked as "X" corresponds to a location characterized in the location information. An innermost boundary 150 can define an approximate error (e.g., +/−3-9 meters) for a GPS derived location. A middle boundary 152 can define an area (expanded by an approximate error) serviced by the identified Wi-Fi® router. An outermost boundary 154 can define an area (expanded by an approximate error) serviced by the identified cellular communications tower. In the illustration of FIG. 3, the innermost boundary 150 is completely contained in an area defined by the middle boundary 152 and the middle boundary 152 is completely contained in an area defined by the outermost boundary 154. Thus, in FIG. 3, the locations of the innermost boundary 150, the middle boundary 152 and the outermost boundary 154 are positioned as would be expected. That is, the area of coverage of defined by the cell-ID includes the area of coverage with the SSID, which in turn includes the location characterized in the location information, with an acceptable error range. Accordingly, based on the conceptualized example illustrated in FIG. 3, the location error test could generate positive results.

Figure 4:
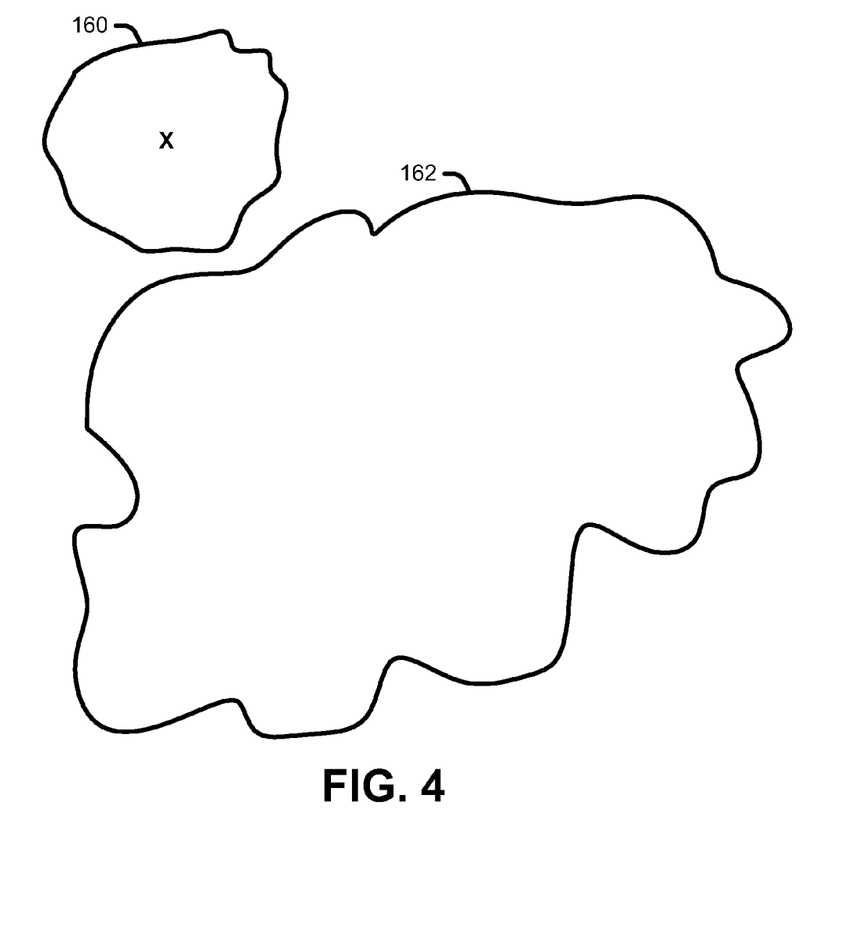
FIG. 4 illustrates another conceptualized example of an analysis of a location error test.

FIG. 4 illustrates a conceptualized illustration of an example where the error location test could be configured to generate results that indicate that the location characterized by the location information provided from the mobile device may be untrustworthy and/or inaccurate. In FIG. 4, position 'X' indicates the position characterized in the location information. In the example illustrated in FIG. 4, it is presumed that the location characterized by the location information is derived from the identified Wi-Fi® router. However, as indicated in FIG. 4, a boundary 160 of area serviced by the identified Wi-Fi® router is outside a boundary 162 of an area serviced by the identified cellular communications tower. Thus, in FIG. 4, the expected positions of the area serviced by the identified Wi-Fi® router and the area serviced by the identified cellular communications tower are misaligned. Therefore, in the conceptualized example illustrated in FIG. 4, the error location test can generate negative results.

Referring back to FIG. 2, a fourth test of the N number of tests 114 can be a carrier network proximity test. The carrier network proximity test can analyze the measurements to determine a cell-ID of a cellular communications tower communicating with the wireless device, which can be referred to as a primary cellular communications tower, as well as the cell-IDs of nearby detected cellular communications towers, which can be referred to as nearby cellular communications towers. The carrier network proximity test can query the location ID database 116 to determine an area serviced by the primary cellular communications tower and the nearby cellular communications towers. The carrier network proximity test can analyze the measurement data to determine whether the nearby cellular communications towers identified in the measurements of the mobile device are consistent with cellular communications towers observable while communicating with the primary cellular communications tower.

For example, the carrier network proximity test can determine if the areas serviced by the primary and nearby cellular communications towers are located within a threshold distance. If the carrier network proximity test determines that the areas serviced by the primary nearby cellular communications towers are separated by a distance at or above the threshold, the carrier network proximity test can generate negative results. Conversely, if the carrier network proximity test determines that the areas serviced by the primary nearby cellular communications towers are separated by a distance below the threshold, the carrier network proximity test can positive generate results.

A fifth test of the N number of tests 114 can be a Wi-Fi® network proximity test. The Wi-Fi® network proximity test can analyze the measurement data to determine an SSID of a Wi-Fi® router communicating with the wireless device, which can be referred to as a primary communication Wi-Fi® router, as well as the SSIDs of nearby detected Wi-Fi® routers, which can be referred to as nearby Wi-Fi® routers. The Wi-Fi® network proximity test can query the location ID database 116 to determine an area serviced by the primary Wi-Fi® router and the nearby Wi-Fi® routers.

The Wi-Fi® network proximity test can determine if the areas serviced by the primary and nearby Wi-Fi® routers are located within a threshold distance. If the carrier network proximity test determines that the areas serviced by the primary and nearby Wi-Fi® routers are separated by a distance at or above the threshold, the Wi-Fi® network proximity test can generate negative results. Conversely, if the Wi-Fi® network proximity test determines that the areas serviced by the primary and nearby Wi-Fi® routers are separated by a distance below the threshold, the Wi-Fi® network proximity test can generate positive results.

A sixth test of the N number of tests 114 can be a distance change test. The distance change test can analyze the measurement data to determine the unique identifier of the mobile device. Moreover, the distance change test can query a mobile device database 118 to determine a previously reported location of the mobile device. The distance change test can determine if the location characterized in the location information is within a threshold distance of the previously reported location of the mobile device. The distance change test can generate negative results if the location characterized in the location information is more than the threshold distance from the previously reported location of the mobile device. Conversely, the distance change test can generate positive results if the location characterized in the location information is within a distance that is less than or equal to the threshold distance from the previously reported location of the mobile device.

A seventh test of the N number of tests 114 can be an application test. The application test can analyze the measurements to determine a list of applications stored on the mobile device. The application test can be configured to review an application blacklist 120 (e.g., which can be stored in a database) to determine if any of the applications stored on the mobile device are included on the application blacklist. The application blacklist 120 could be, for example, a list of known applications that facilitate spoofing a physical location of a mobile device. If any of the applications stored on the mobile device are included in the application blacklist, the application test can generate negative results. Conversely, if none of the applications stored on the mobile device are on the application blacklist, the application test can generate positive results.

An eight test of the N number of tests 114 can be a mobile device settings test. The mobile device settings test can analyze the measurements to determine if settings of the mobile device indicate that the location characterized by the location information provided from the mobile device is likely to be spoofed. In one example, a setting for the mobile device could be a setting of "Allow Mock Location" (or similar setting). If the settings test indicates that "Allow Mock Location" is set to "ON" (or similar), the device settings test can generate negative results. Conversely, if the settings test indicates that "Allow Mock Location" is set to "OFF" (or similar), the device settings test can generate positive results.

A ninth test of the N number of tests 114 can be a historical trust test. The historical trust test can access the mobile device database 118 based on a unique identifier of the mobile device. The historical trust test can retrieve a historical trust score for the mobile device that indicates a previously determined location trust score for the mobile device. If the historical trust score for the mobile device is below a threshold, the historical trust test can generate negative results. Conversely, if the historical trust score for the mobile device is at or above the threshold, the historical test can generate positive results.

A tenth test of the N number of tests 114 can be a tampering test. The tampering test can evaluate the mobile device information to analyze the tampering status of the mobile device. If the tampering status indicates that the mobile device has been hacked (e.g., "jailbroken" or "rooted") to achieve privilege escalation, the tampering test can generate negative results. Conversely, if the tampering status indicates that the mobile device has been not been hacked, the tampering test can generate positive results.

The results from each of the N number of tests 114 can be weighted and summed by the trust score calculator 112 to generate the location trust score. For instance, a positive result (e.g., indicating that the location information provided by the mobile device is likely to be accurate and/or trustworthy), can have a value of '1' and a negative result (e.g., indicating that the location information provided by the mobile device may not be accurate and/or trustworthy) can have a value of '0'. In such a situation, each result could be multiplied by a factor that corresponds to a weight given to a particular test of the N number of tests 114. It is to be understood that in other examples, different numbers could be employed and different evaluation methods could be employed to determine the location trust score. For instance, in some situations, it may be desirable that if any test (e.g., except for the boundary test) or a particular test generates negative results, the trust score is automatically set to a particular level (e.g., a low value).

The location trust score for the mobile device can be provided to a location determiner 122 that can be stored in the memory 102. The location determiner 122 can be configured to select between employing carrier location information that can be provided from a network node of a carrier network for the mobile device and employing the location information included in the measurements to generate trusted location information for the mobile device based on the location trust score of the mobile device. For example, the location determiner 122 can evaluate the location trust score to determine if the location trust score is at or above a threshold value. If the location trust score for the mobile device is at or above the threshold value, the location determiner 122 can generate the trusted location information for the enterprise server that data that identifies the location of the mobile device as the location characterized in the location information provided from the mobile device. The trusted location information can include, for example, location information for the mobile device, and in some examples, the location trust score. In such a situation, the location determiner 122 can provide the trusted location information for the enterprise server to the message handler 110.

Alternatively, if the location trust score for the mobile device is below the threshold value, the location determiner 122 can determine that a carrier network for the mobile device should be queried. In such a situation, the location determiner 122 can cause the message handler 110 to transmit a carrier location request to a network node, such as a server (e.g., a home location register) or switch associated with a carrier of the mobile device via the network 108. In response, the message handler 110 can receive carrier location information that can be forwarded to the location determiner 122. The location determiner 122 can generate the trusted location information for the enterprise server that employs the carrier location information to characterize a determined location for the mobile device. Moreover, the location determiner 122 can provide the trusted location information to the message handler 110.

The message handler 110 can transmit the trusted location information to the enterprise server via the network 108. Moreover, the enterprise server can leverage the trusted location information for the mobile device in the manner described herein with a relative degree of confidence that the location described in the trusted location information is accurate and/or trustworthy. By employing the Trusted Location gateway 100, the need for the issuance of carrier location requests (which are often charged on a per-request basis) can be reduced.

Figure 5:
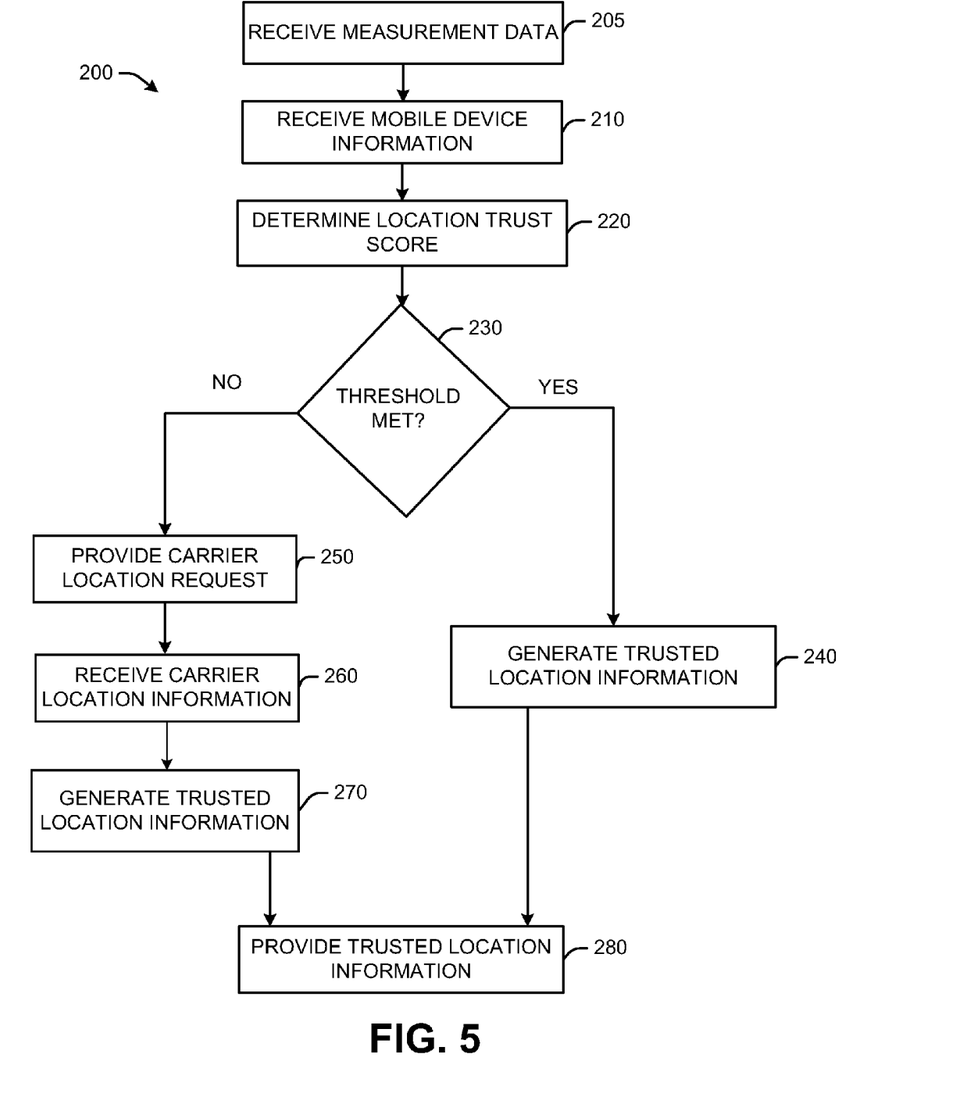
FIG. 5 illustrates an example of a flowchart of an example method for verifying whether location information provided from a mobile device is accurate and/or trustworthy.
Figure 6:
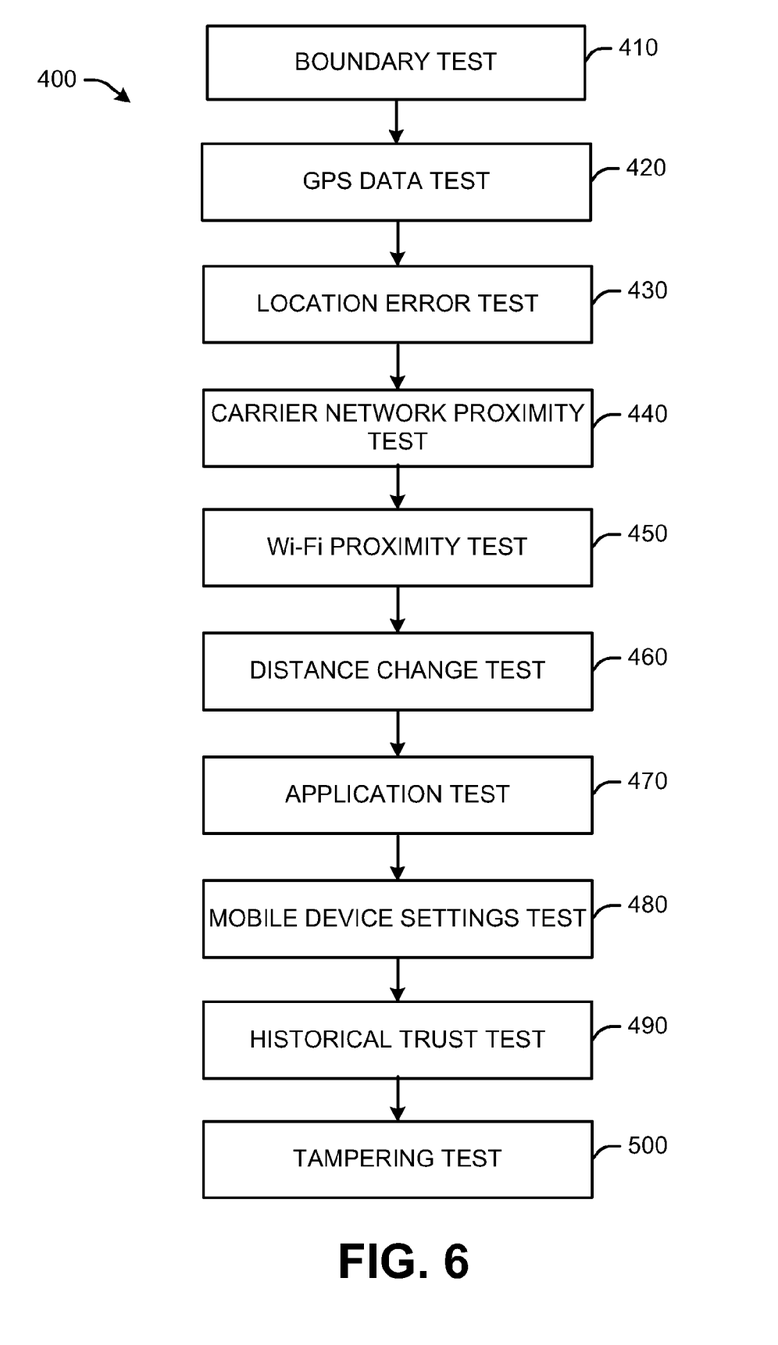
FIG. 6 illustrates an example of a flowchart of an example method for calculating a location trust score.

In view of the foregoing structural and functional features described above, example methods will be better appreciated with reference to FIGS. 5 and 6. While, for purposes of simplicity of explanation, the example methods of FIGS. 5 and 6 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIGS. 5 and 6 can be implemented as instructions stored in a non-transitory machine-readable medium. The instructions can be accessed by a processing resource (e.g., one or more processor cores) and executed to perform the methods disclosed herein.

FIG. 5 illustrates an example flowchart of a method 200 for generating and providing trusted location information for a mobile device. The method 200 could be implemented, for example, by the system 50 illustrated in FIG. 1 and/or the Trusted Location gateway 100 illustrated in FIG. 2. At 205, measurement data can be received at a message handler (e.g., the message handler 110 illustrated in FIG. 2). The measurement data can characterize measurements taken by the mobile device. At 210, mobile device information can be received, for example at the message handler. The mobile device information could be provided, for example, from an MDM server (e.g., the MDM server 62 illustrated in FIG. 1) or the mobile device (e.g., via an agent executing on the mobile device). In some examples, the mobile device information and the measurement data can be combined and sent in a single message. Additionally, in some examples, the measurement data and the mobile device information can be provided in response to a location request issued to a Trusted Location agent (e.g., the Trusted Location agent 54 illustrated in FIG. 1) executing on the mobile device. In other examples, the measurement data and the mobile device information can be sent in response to the Trusted Location agent providing measurements to the MDM server.

At 220, a location trust score can be determined for the mobile device by a trust calculator (e.g., by the trust score calculator 112 of FIG. 2). The location trust score can be determined/calculated, for example by executing the N number of tests 114 illustrated in FIG. 2. At 230, a determination can be made by a location determiner (e.g., the location determiner 122 of FIG. 2) as to whether the location trust score is at or above a threshold value. If the determination at 230 is positive (e.g., YES), the method 200 can proceed to 240. If the determination is negative (e.g., NO), the method can proceed to 250.

At 240, trusted location information can be generated for an enterprise server (e.g., the enterprise server 60 illustrated in FIG. 1). The trusted location information can include a location of the mobile device that is included in the measurement data, such that the location of the mobile device is derived by the mobile device.

At 250, a carrier location request can be provided by a message handler (e.g., the message handler 110 of FIG. 2) to a network node (e.g., a home location server or switch) of a carrier network that services the mobile device. At 260, carrier location information can be received at the message handler. At 270, trusted location information can be generated by the location determiner that employs a location for the mobile device identified in the carrier location information. At 280, the trusted location information (generated at either 240 or 270) can be provided by the message handler to the enterprise server. In some examples, some actions of the method 200 can be repeated, such that the trusted location information (including the calculated location trust score) can be provide to the enterprise server as an initial trusted location information, wherein some actions (e.g., additional tests and/or receipt of additional measurement data) can be repeated to determine an updated trusted location information, and the updated trusted location information can be sent to the enterprise server.

FIG. 6 illustrates an example flowchart of a method 400 to determine a trusted location score. The method 400 could be employed, for example, to implement the action 220 illustrated in FIG. 5. The method 400 could be implemented, for example, by the trust score calculator 112 of FIG. 2.

At 410, a boundary test can be executed that can make determination as to whether location information included in measurements of mobile device information indicates a physical location for the mobile device that is within a predetermined boundary. The predetermined boundary could be specified, for example, in the measurement data and/or provided from another source (e.g., the enterprise server 60 of FIG. 1). If the boundary test indicates that the mobile device is outside the predetermined boundary, the boundary test can generate positive results and if the boundary test indicates that the mobile device is inside the predetermined boundary, the boundary test can generate negative results. Moreover, it is noted that in some instances, positive results of the boundary test can also obviate the need to execute subsequent tests, such that the method 400 can be ended.

At 420 a GPS data test can be executed. The GPS data test can analyze the measurements to determine if GPS information included in the measurements would reflect actual GPS signals received from GPS satellites at the location characterized in the location information. The GPS data test can be configured such that if the GPS data included in the measurements would not normally be received at the location characterized in the location information provided by the mobile device, the GPS data test can generate negative results. Conversely, the GPS data test can generate positive results if the GPS data included in the measurements would normally be received at the location characterized in the location information provided by the mobile device.

At 430, a location error test can be executed to determine whether a location characterized in the location information included in the measurements is consistent with a known area serviced by at least one of an identified Wi-Fi® router and an identified cellular communications tower. The location error test can generate negative results if the location characterized by the location information is outside an area serviced by the identified Wi-Fi® router and/or if the area serviced by the Wi-Fi® router with the service ID is outside the area serviced by the identified cellular communications tower. The location error test can generate positive results if the location characterized by the location information is within an area serviced by the identified Wi-Fi® router and/or if the area serviced by the identified Wi-Fi® router is within the area serviced by the identified cellular communications tower.

At 440, a carrier network proximity test can be executed. The carrier network proximity test can analyze the measurement data to determine whether nearby cellular communications towers identified in the measurements of the mobile device are consistent with cellular communications towers observable while communicating with a primary cellular communications tower. If the carrier network proximity test determines the nearby cellular communications towers would not be observable while communicating with the primary communications tower, the carrier network proximity test can generate negative results. Conversely, if the carrier network proximity test determines the nearby cellular communications towers would be observable while communicating with the primary communications tower, the carrier network proximity test can generate positive results.

At 450, a Wi-Fi® network proximity test can be executed. The Wi-Fi® network proximity test can analyze the measurement data to determine if nearby Wi-Fi® routers identified in the measurements of the mobile device are consistent with Wi-Fi® routers observable while communicating with a primary Wi-Fi® router. For example, the Wi-Fi® network proximity test can determine if the areas serviced by the primary and nearby Wi-Fi® routers are located within a threshold distance. If the carrier network proximity test determines that the areas serviced by the primary and nearby Wi-Fi® routers are separated by a distance at or above the threshold, the carrier network proximity test can generate negative results. Conversely, if the Wi-Fi® network proximity test determines that the areas serviced by the primary and nearby Wi-Fi® routers are separated by a distance below the threshold, the Wi-Fi® network proximity test can generate positive results.

At 460, a distance change test can be executed. The distance change test can determine if the location characterized in the location information is within a threshold distance of a previously reported location of the mobile device. The distance change test can generate negative results if the location characterized in the location information is more than the threshold distance from the previously reported location of the mobile device. Conversely, the distance change test can generate positive results if the location characterized in the location information is within a distance that is less than or equal to the threshold distance from the previously reported location of the mobile device.

At 470, an application test can be executed. The application test can be configured to review an application blacklist to determine if any of the applications stored and/or installed on the mobile device are included on the application blacklist. If any of the applications stored and/or installed on the mobile device are included in the application blacklist, the application test can generate negative results. Conversely, if none of the applications stored on the mobile device are on the application blacklist, the application test can generate positive results.

At 480, a mobile device settings test can be executed to determine if settings of the mobile device indicate that the location characterized by the location information provided from the mobile device is likely to be spoofed. If the settings test indicates that "Allow Mock Location" (or similar feature) is set to "ON" (or similar), the device settings test can generate negative results. Conversely, if the settings test indicates that "Allow Mock Location" is set to "OFF" (or similar), the device settings test can generate positive results.

At 490 a historical trust test can be executed to determine if a historical trust score for the mobile device that indicates a previously determined location trust score for the mobile device is below a threshold. In such a situation, the historical trust test can generate negative results. Conversely, if the historical trust score for the mobile device is at or above the threshold, the historical test can generate positive results.

At 500, a tampering test can be executed. The tampering test can evaluate the mobile device information to analyze the tampering status of the mobile device to determine if the mobile device has been hacked in a manner that results in privilege escalation. If the tampering status indicates that the mobile device has been hacked (e.g., "jailbroken" or "rooted"), the tampering test can generate negative results. Conversely, if the tampering status indicates that the mobile device has not been hacked, the tampering test can generate positive results.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A gateway comprising one or more computers having machine readable instructions, the gateway being configured to:
   receive measurement data that characterizes measurements taken at a mobile device, wherein the measurement data includes location information for the mobile device;
   calculate a location trust score for the mobile device, wherein the location trust score characterizes a trustworthiness of the location information, wherein the trustworthiness of the location information corresponds to a likelihood that the location information for the mobile device has been spoofed;
   generate trusted location information that characterizes a location of the mobile device based on the location trust score, wherein the generating comprises:
      providing a request for a carrier location information to a network node associated with a carrier network of the mobile device in response to determining that the location trust score is below a threshold value; and
      employing the carrier location received from the network node associated with the carrier network to generate the trusted location information in further response to determining that the location trust score is below the threshold value.

2. The gateway of claim 1, wherein the gateway is further configured to employ the location information included in the measurements to generate the trusted location information in response to determining that the location trust score is at or above the threshold value.

3. The gateway of claim 1, wherein calculating the location trust score comprises execution of a boundary test to determine whether a location characterized by the location information is within a predetermined geographic boundary.

4. The gateway of claim 1, wherein calculating the location trust score comprises execution of a global position system (GPS) data test to determine whether GPS data included in the measurements would reflect actual GPS signals received at a location characterized in the location information.

5. The gateway of claim 1, wherein calculating the location trust score comprises execution of a location error test to determine whether a location characterized in the location information is consistent with a location for the mobile device that is calculated at the gateway based on the measurement data.

6. The gateway of claim 1, wherein calculating the location trust score comprises execution of a carrier network proximity test to determine whether nearby cellular communications towers identified in the measurements of the mobile device are consistent with cellular communications towers observable while communicating with a primary cellular communications tower.

7. The gateway of claim 1, wherein calculating the location trust score comprises execution of a Wi-Fi® network proximity test to determine whether nearby Wi-Fi® routers identified in the measurements of the mobile device are consistent with Wi-Fi® routers observable while communicating with a primary cellular communications tower.

8. The gateway of claim 1, wherein calculating the location trust score comprises execution of a distance change test to determine whether a location characterized in the location information is within a threshold distance of a previously determined location of the mobile device.

9. The gateway of claim 1, wherein calculating the location trust score comprises execution of an application test to determine whether an application stored on the mobile device is included on an application blacklist.

10. The gateway of claim 1, wherein calculating the location trust score comprises execution of a mobile device settings test to determine whether settings of the mobile device indicate that a location identified in the location information may be spoofed.

11. The gateway of claim 1, wherein calculating the location trust score comprises execution of a historical trust test to determine whether a previous location trust score of the mobile device is at or above a threshold value.

12. The gateway of claim 1, wherein the gateway is further configured to:
   receive mobile device information; and
   execute a tampering test based on a tampering status included in the mobile device information to determine if the mobile device has been hacked in a manner that resulted in privilege escalation.

13. The gateway of claim 1, wherein the gateway is further configured to push a remote location request to an agent of the gateway executing on the mobile device in response to a location request from an enterprise server.

14. The gateway of claim 1, wherein the trusted location information is initial trusted location information, the gateway being further configured to:

provide the initial trusted location information to a server;
calculate an updated trusted location information for the mobile device based on additional measurement data that characterizes additional measurements taken at the mobile device; and
provide the updated trusted location information to the server.

15. A gateway system comprising one or more computing devices, the one or more computing devices comprising:
a non-transitory memory configured to store machine readable instructions; and
a processing unit comprising a processor core, the processing unit being configured to access the memory and execute the machine readable instructions, the machine readable instructions comprising:
a message handler configured to receive measurement data that includes measurements taken by a mobile device, wherein the measurement data includes location information for the mobile device;
a location determiner configured to select between employing carrier location information provideable from a network node of a carrier network for the mobile device and employing the location information included in the measurements to generate trusted location information for the mobile device based on a location trust score for the mobile device; and
a trust score calculator configured to:
determine the location trust score for the mobile device, wherein the location trust score characterizes a likelihood that the location information included in the measurements is at least one of accurate and trustworthy; and
execute a tampering test for the mobile device to determine whether mobile device information received at the message handler indicates that the mobile device has been hacked in a manner that resulted in privilege escalation.

16. A method comprising:
receiving information related to a mobile device that includes measurements taken at the mobile device, wherein the measurements includes location information for the mobile device;
determining a location trust score for the mobile device, wherein the location trust score characterizes a trustworthiness of the location information, wherein the trustworthiness of the location information corresponds to a likelihood that the location information for the mobile device has been spoofed; and
selecting between employing carrier location information provideable from a network node of a carrier network for the mobile device and employing the location information included in the measurements to generate trusted location information for the mobile device based on a location trust score of the mobile device.

17. The method of claim 16, wherein the determining includes executing a GPS data test to determine whether GPS data included in the measurements would reflect actual GPS signals received at a location characterized in the location information.

18. The method of claim 16, pushing a remote location request to an agent executing on the mobile device in response to receipt of a location request for the mobile device.

19. The method of claim 16, further providing the trusted location information for the mobile device to an enterprise server.

20. The method of claim 16, wherein the network node associated with the carrier network of the mobile device is not queried for the carrier location information in response to determining that the location trust score is at or above a threshold value.

* * * * *